United States Patent [19]  [11] 3,942,480
Hair et al.  [45] Mar. 9, 1976

[54] REMOVABLE ARTHROPOD REPELLENT DEVICE FOR ATTACHMENT TO THE EAR OF AN AGRICULTURAL ANIMAL

[75] Inventors: Jakie A. Hair; Thomas C. Randolph, both of Stillwater, Okla.

[73] Assignee: The Board of Regents for the Oklahoma Agricultural and Mechanical Colleges Acting for and on behalf of Oklahoma State University Argriculture & Applied Science, Stillwater, Okla.

[22] Filed: Feb. 24, 1975

[21] Appl. No.: 552,657

[52] U.S. Cl. ............................... 119/156; 40/302
[51] Int. Cl.² ........................................ A01K 13/00
[58] Field of Search ....... 119/156; 40/300, 301, 302

[56] References Cited
UNITED STATES PATENTS
3,468,050  9/1969  Pool .................................... 40/302
3,756,200  9/1973  Ohlhauser ......................... 119/156

Primary Examiner—Hugh R. Chamblee
Attorney, Agent, or Firm—Head, Johnson and Chafin

[57] ABSTRACT

An arthropod repellent device for attachment to the pinnal portion of the ear of an agricultural animal, such as a cow, horse, sheep, goat, swine or the like, including a band or belt of flexible plastic material of about ⅝ inch to 1½ inches wide and of a thickness of about 3/16 inch to about ⅝ inch, the material having an arthropod repellent chemical incorporated therein, the length of the band or belt being sufficient to encompass the base of the pinnal portion of the ear of the animal, or mostly thereof, to which it is applied, and means of penetrating the pinna and the band or belt to retain such in position around the base of the animal's ear pinnal portion. In one embodiment, a separate attachment element is employed to retain the band into position and in another embodiment, an attachment element is integral with the band or belt.

7 Claims, 7 Drawing Figures

REMOVABLE ARTHROPOD REPELLENT DEVICE FOR ATTACHMENT TO THE EAR OF AN AGRICULTURAL ANIMAL

BACKGROUND, SUMMARY AND OBJECTS OF THE INVENTION

A common problem with livestock, particularly cows, but also of less severity with other species, including horses, sheep, goats, swine, etc., is their infestation by arthropods. In recent years, a particularly severe problem has arisen because of the infestation of the ears of cattle by ticks. Ticks attach themselves in the auditory meatus portion of the ears of cattle and go unnoticed until severe damage is done. At the least, ticks are debilitating to the animal and are common carriers of infectious diseases, such as anaplasmosis. At the worst, ticks can, by their severe debilitating character as they feed, cause death of the animal which they infest. Under any condition, an attack of ticks in the ears of agricultural animals results in reduced growth rate of beef cattle and milk production of milk cattle. The consequence is great economic loss to the agricultural industry, particularly in the warmer climates.

Volatile and residual acaricides have been manufactured and are currently available which are highly effective in repelling and killing ticks. Such chemicals include 2,2 - Dichlorovinyl dimethyl phosphate, as an example. Chemicals of this type, have been employed in the manufacture of arthropod repellent collars for dogs and cats, however, a difficult problem has arisen with the use of such chemicals in an expedient manner to repell the ticks to prevent infestation of the ears of agricultural livestock. The problem arises in that while it is relatively easy to provide a collar for loosely positioning around the neck of an animal, such as a dog or cat, it is difficult to provide a means of repelling arthropods having a propensity to move into the ear of an agricultural animal.

One example of an attempt to provide the mechanical apparatus for repelling ticks is disclosed in U.S. Pat. No. 3,765,200 issued to William T. Oldhausen on Sept. 4, 1973. In this patent an apparatus is described including a roll of material which extends deep into the auditor meatus of the aminal's ear and includes integral tabs extending outwardly from an edge of the material which are retained in the animal's pinnal portion of the ear by means of rivets or the like. While this device may be successful in repelling some ticks from entering the animal's ear, it has disadvantages. By extending deep into the animal's auditor meatus, a great opportunity for irritation exists. A second difficulty is that all known chemical repellents used for incorporation in plastic material have a relatively short, useful life, extending not much beyond two or three months. This means that for effective control the repellent device must be replaced at relatively short intervals. The device shown in the Oldhausen patent is not adaptive for easy replacement, nor, as shown by extensive research on similar devices by the present invention, would such a device be effective to an acceptable extent in controlling arthropods infecting cattle.

It is an object of this invention to provide an arthropod repellent device for attachment to the pinnal portion of the ear of an agricultural animal which is easy to apply, effective and relatively easy to replace.

More particularly, an object of this invention is to provide an arthropod repellent device for attachment to the pinna of an agricultural animal, such as cow, horse, sheep, goat, swine or the like, including a band or belt of material of length sufficient to encompass the base of the pinna, or mostly thereof, and including means of retaining the article in position around the base of the pinna.

Still more particularly, an object of this invention is to provide an arthropod repellent device for attachment to the pinnal portion of the ear of an agricultural animal, including an elongated cylindrical attachment element which may be positioned in an opening in the pinna of the animal ear, including means of removably engaging a flexible band or belt having arthropod repellent incorporated therewith to the attachment element whereby the band or belt may be removed and replaced as required.

In another embodiment, the invention includes a band or belt of material having an arthropod repellent incorporated therein including an integral attachment means for positioning in a hole the pinnal portion of an animal's ear for retaining the band in position.

These general objects, as well as other and more specific objects of the invention will be fulfilled in the following description and claims, taken in conjunction with the attached drawings.

DESCRIPTION OF THE VIEWS

DETAILED DESCRIPTION

Figure 1:
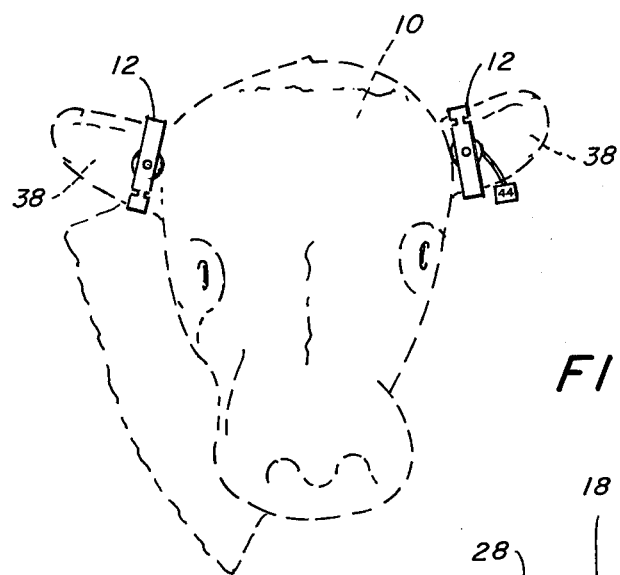
FIG. 1 is a view of the head of an agricultural animal, in this instance, a cow, showing the arthropod repellent bands of this invention attached to the pinnal portion of the ears of the animals.
Figure 2:
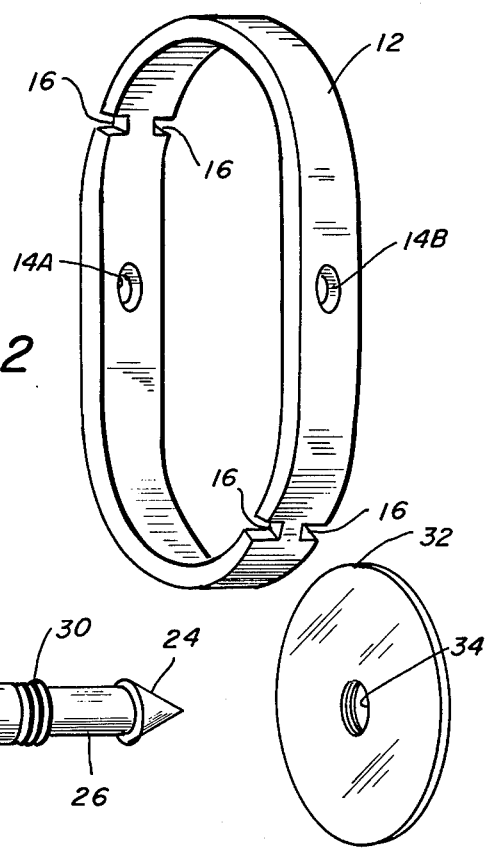
FIG. 2 is an isometric view of one embodiment of the repellent band of this invention.

Referring now to the drawings and first to FIG. 1, a cow 10 is shown having the arthropod repellent bands 12 around the base of the pinnal portions of each ear. The band 12, as shown best in FIG. 2 is a ring of flexible plastic material of about ⅜ to 1 ½ inches wide and about 3/16 to ⅜ inch thick. The material of which band 12 is composed is of plastic material having an arthropod repellent chemical incorporated therein. One example of a chemical which may be employed for this purpose is 2,2 - Dichlorovinyl dimethyl phosphate, however, this is by example only and such chemical forms no part of this invention and the invention is not limited to any particular chemical which may be employed since several known acaricides and repellent chemicals which may be integrated with flexible plastic materials are known in the art at the present time.

The band 12 has openings 14A and 14B therein arranged such that when the band is folded into a flattened elongated loop, as shown in FIG. 2, the openings 14A and 14B are approximately opposed to each other. In addition, the band 12 includes notches 16, the purpose of which is to make the band easily severable so that after attachment to an animal's ear, if the band becomes caught on wire, a tree limb, or the like, the band itself will tear loose rather than pin the animal to such objects or result in injury to the animal's ear.

Figures 3, 3A:
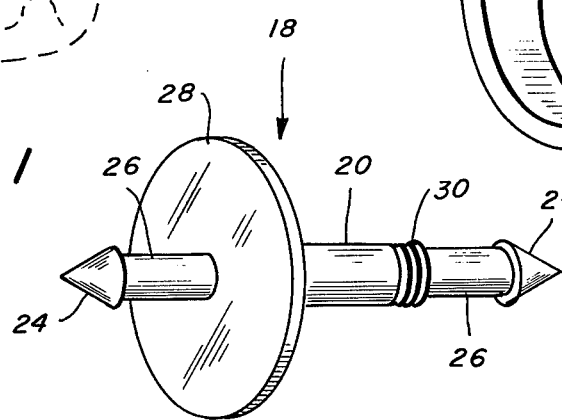
FIG. 3 is an isometric view of an attachment member for use in removably attaching the band of FIG. 2 to the ear of an animal.
FIG. 3A is an isometric view of removable collar member which forms a portion of the attachment element of FIG. 3.

FIG. 3 shows one example of an attachment member for retaining the band 12 around the base of the pinnal portion of an agricultural animal's ear. The attachment member 18 is an elongated cylindrical device having an intermediate portion 20 and a conical or arrow shaped integral portion 24 at each outer end. Adjacent to the arrow shaped outer portions 24 the member has integral reduced diameter shank portions 26. The base of the arrow shaped portions 24 are of a diameter larger than the shank portions 26. The diameter of the shank portions 26 is equal to or slightly less than the diameter of openings 14A and 14B in band 12. In the arrangement of FIG. 3, the attachment member has an integral collar portion 28 of increased diameter coaxial with the member and spaced from one end 24 by a shank portion 26. At the other end of the intermediate portion 20 are threads 30. FIG. 3 shows a removable collar portion 32 of a diameter and thickness equal to that of the integral collar portion 28. The removable collar portion 32 has a threaded axial opening 34.

Figure 4:
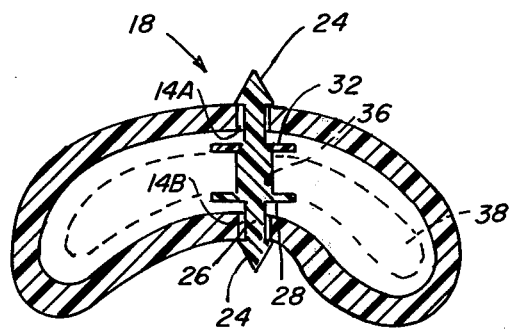
FIG. 4 is a cross-sectional view of the attachment device of FIGS. 3 and 3A and the band of FIG. 2, as applied to the ear of an agricultural animal.

FIG. 4 shows the arrangement for use of the attachment member of FIG. 3 and FIG. 3A. The attachment member 18 is positioned in an opening 36 formed in the pinnal portion 38 of an animal's ear. The opening 36 may be performed as a separate operation (by a tool not disclosed herein) or the member 18 may be forced through the pinna of the animal to provide opening 36. Integral collar 28 engages one side of the ear of the animal. After insertion of the attachment member 18 the removable collar 32 is threaded onto the other end. The attachment member is then affixed to the ear of the animal and remains in position as long as desired, although it can be removed by unthreading the removable collar 32. The attachment member is now ready to receive the repellent band 12 which is looped about the ear of the animal. The band is forced against the arrow shaped portions 24 at each outer end of the attachment member so that the openings 14A and 14B are temporarily enlarged to slide over the enlarged portions of the arrow shaped ends. Opening 14A and 14B are received by the attachment member shank portion 26. The band 12 is now held securely in position around the ear of the animal.

The attachment member 18 is preferably applied near the base of the animal's ear so that the band 12 fits around the base. Since the band must nearly encompass the ear any arthropod moving towards the auditory meatus portion of the ear must pass over or adjacent the band. At the same time, any arthropod which does move into the inner ear are in close proximity to the chemicals eminating from the band 12 and will be repelled or killed. The band, however, does not extend within the auditor meatus portion of the ear of the animal and thereby should not cause irritation or infection.

To remove the band 12 it may be forced back over the arrow shaped portions 24 by inserting a toll (not shown) between the animal ear and the band. As an alternative by the use of wire cutting pliers, or diagonal pliers, the band may be snipped adjacent the opening 14A and 14B to easily remove the band without causing discomfort to the animal. Once an old band is removed, a replacement band may be easily inserted onto the attachment member 18.

Figure 5:
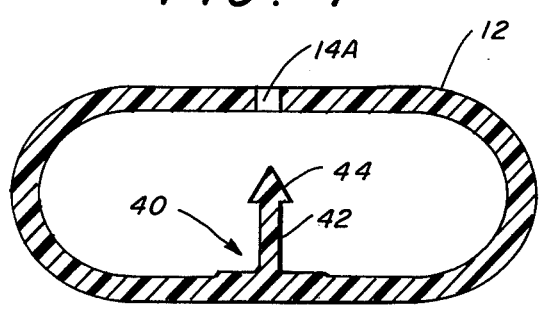
FIG. 5 is a cross-sectional view of a band showing an alternate embodiment of the invention including an integral attachment member.

FIG. 5 shows an alternate arrangement of the invention. In this arrangement the band 12, shown in cross-section, includes a single opening 14A and opposed to it, an integral attachment portion 40. The integral attachment portion includes an integral shank portion 42 and an outer arrow shaped or more precisely, a conical shaped portion 44. The diameter of shank portion 42 is equal to or slightly less than the diameter of opening 14A. The base of the arrow shaped outer portion 44 is larger than opening 14A. The embodiment of FIG. 5 is utilized in this manner: an opening is formed in the pinnal portion of the ear of the animal to which the device is to be applied adjacent to the base of the ear; the band 12 is looped about the ear and the integral attachment portion 40 is inserted through the openings; and the integral arrow shaped portion 44 is forced through openings 14A. The device is then retained in position. The device may be removed by cutting the band with wire cutting type pliers at either side of opening 14A and the integral attachment portion 40 withdrawn from the opening in the animal's ear. As an additional arrangement, the integral attachment portion, including the shank portion 42 and arrow shaped portion 44, may be formed of a material harder than the pliable portion of the band 12 so that by means of a proper tool (now shown) the arrow shaped portion 44 may be forced directly through an animal's ear and through the opening 14A in the band. When this arrangement is used, the opening in the animal's ear will need be forced only once since, when the band is replaced, the same opening may be employed.

Figure 6:
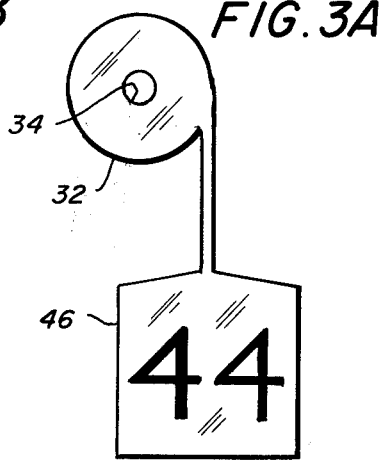
FIG. 6 is an alternate arrangement of the collar portion of FIG. 3A including an identification tag integrally connected with the collar portion.

FIG. 6 shows an alternate embodiment of the removable collar 32 as used with the attachment member 18 of FIG. 3. Extending from the removable collar 32 is an integral tag portion 46 which may have an identifying letter or numeral thereon. This integral tag portion provides a means for easily identifying animals utilizing the devices of this invention, and may be helpful in scheduling replacement of the repellent bands.

In this description the term "ear" of an animal refers to the exterior, or pinnal portion of the ear. The term "arthropod repellent" includes insect repellent, toxicants, attractants or combinations.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. An arthropod repellent device for attachment to the pinnal portion of the ear of an agricultural animal, such as a cow, horse, sheep, goat, swine, or the like, comprising:
   a band of pliable plastic material of about ⅜ inch to about 1 ½ inches wide and of about 3/16 inch to about ⅜ inch thick, the material having an arthropod insecticide incorporated therein, the length of the band being sufficient to encompass the base or most thereof of the pinnal portion of the ear of the animal to which it is applied; and means penetrating the pinna of an animal to retain said band in position around the base of the pinnal portion of the animal's ear.

2. An arthropod repellent device according to claim 1 wherein said band or belt has two openings therein spaced such that as the band is folded into an enlongated loop the openings are opposed and wherein said means to retain said band in position around the base of the pinnal portion of an animal's ear includes:

an elongated attachment member having a diameter equal to or less than the diameter of said openings in said band and having an integral pointed arrow shaped portion at each end, the base of each arrow shaped end portion having a diameter larger than said openings in said band, said member being insertable through an opening in the pinnal portion of an animal's ear, said integral arrow shaped portions at each end being forcibly positionable through one of said openings in said band, said band being retained about the pinna of an animal by said integral arrow shaped end portions of said attachment member.

3. An arthropod repellent device according to claim 2 wherein said attachment member includes an integral flat, enlarged diameter coaxial collar portion spaced from one end thereof and a threaded portion spaced from the other end thereof; and a removable collar member of similar diameter and thickness of said integral collar portion, the removable collar member having a threaded axial opening therein of a size to threadably engage the threaded portion of said attachment member, said collar member being positionable adjacent the surface of an animal's ear pinnal portion after said attachment member is positioned through the pinna, said integral arrow shaped end portions of said attachment member extending beyond said collars to receive said band thereon.

4. An arthropod repellent device according to claim 3 wherein said removable collar member has an integral identification tag portion extending therefrom.

5. An arthropod repellent device according to claim 1 wherein said band has at least one notch formed in one edge thereof providing a weak point in said band whereby the band will be easily severed.

6. An arthropod repellent device according to claim 1 wherein said band or belt has an opening therein, and having an integral attachment portion extending from the band at a point opposed said opening when said band is folded in the shape of a flattened loop, the integral attachment portion having a shank portion of a diameter equal to or less than the diameter of said opening and an integral arrow shaped portion at the outer end thereof, the arrow shaped portion being forcibly positionable through said opening in said band, and base of the arrow shaped portion having a diameter greater than the normal diameter of said opening in said band whereby said attachment portion is extendable through an opening in an animal's ear and forcibly through said opening in said band and is retained in such position by said arrow shaped portion.

7. An arthropod repellent device according to claim 6 wherein said band or belt is formed of flexible material and thereby deformable to fit around the pinnal portion of an animal's ear and wherein said attachment portion is of a rigid material capable of forceful penetration of an animal's pinna.

* * * * *